United States Patent Office 3,433,660
Patented Mar. 18, 1969

3,433,660
SPRAY DRYING CARBON BLACK
Merrill E. Jordan, Walpole, and John F. Hardy, Andover, Mass., assignors to Cabot Corporation, Boston, Mass., a corporation of Delaware
No Drawing. Filed June 24, 1965, Ser. No. 466,823
U.S. Cl. 106—307      2 Claims
Int. Cl. C09c 1/58

ABSTRACT OF THE DISCLOSURE

A process for converting a special nitric acid oxidized, high color carbon black to an agglomerated state having a bulk density even higher than normal pellets but composed of very fine aggregates much smaller than normal pellets, which fine aggregates are readily dispersible in liquid vehicles on conventional equipment such as three roll mills which are normally used for producing inks and enamels. The key step in this process is the spray drying of a liquid slurry of such a black made with an anionic dispersing agent in appropriate concentrations.

---

This invention relates to carbon black. More particularly the invention disclosed herein relates to a process for producing a superior high color carbon black which imparts especially desirable properties to enamel systems and the like. Also included within the scope of the present invention are the products resulting from the novel process hereinafter disclosed.

The basic requirements for any color black are high jetness, easy dispersion in appropriate vehicles and good viscosity stability in resultant dispersions. In turn, the properties of the black which are responsible for these characteristics, and accordingly reflect the coloring efficiency of a black are its nigrometer scale, particle size, volatile content, and to some extent, the physical nature of the volatile matter thereon.

The nigrometer scale of a carbon black is a measure of the masstone or the intenseness of jetness or blackness and is closely related to the particle size thereof. In general, the lower the particle size of a carbon black, the lower its scale and the more intense is the blackness thereof. According to recognized standards of the industry "high color blacks" are those with scales below 70, while the scales of "medium color blacks" have scales from about 70 to 78 and "regular color blacks" have scales from about 80 to 90. Another property of importance in color blacks is volatile content which often effects tone and color properties and usually determines flow properties of lacquers and enamels in which carbon black is compounded. The volatile content of a carbon black is an indication of the amount of chemisorbed oxygen and/or other gases on the surface thereof and is determined by measuring the loss of weight on calcining a dried carbon black sample in a covered platinum crucible for seven minutes at about 972° C. The "regular color blacks" generally have volatile contents of no greater than about 5% by weight, whereas the volatile content is generally in the range from 5 to 10% by weight for "medium color blacks" and runs as high as 18% or more for high "color blacks".

In commonly owned application Ser. No. 159,786, filed Dec. 15, 1961, by Jordan et al. now issued as U.S. Patent 3,226,244, the invention of a particularly advantageous high color black was disclosed for the first time. The process disclosed in the aforementioned application, however, although highly advantageous when pelleted forms of carbon black are to be produced, has been found less useful for the production of fluffy blacks which are normally desirable for easy dispersion by less intensive dispersing apparatus than is used for dispersing pelleted blacks. The reason for pelleting blacks is to avoid the extreme dustiness and low bulk density inherent in the fluffy blacks.

Therefore, it is an object of the invention to provide a method for producing high color carbon blacks having excellent dispersibility.

It is another object of the invention to produce a black having a unique combination of high bulk density and easy dispersibility in enamel systems.

A further object of the invention is to provide a carbon black of high to moderate bulk density which is dispersible by apparatus normally used for dispersing fluffy blacks.

It is a further object of the invention to provide a process which is especially suitable for producing non-pelleted high color carbon blacks capable of imparting superior tone, color, gloss, and viscosity stability to the enamel systems in which they are utilized.

A further object of the invention is to provide high bulk-density carbon blacks of small and easily dispersible secondary agglomerates and a process for making the same.

Still other objects of the present invention will be drying the dispersion to form the product of the invention.

Applicants have substantially met the above objects of the invention with a unique process wherein a dispersion of carbon black spray dried to form free-flowing secondary agglomerates having extraordinary dispersibilty and density.

In general the process of the invention comprises (1) preparing, with the aid of a dispersing agent, a dispersion of carbon black in a liquid such as water, and (2) spray drying the dispersion to form the product of the invention. The product formed is believed to be novel in that no other known carbon black has the combination of dispersibility and bulk density advantages provided by the process of this invention. Non-pelleted blacks having bulk densities of over 10 lbs./ft.$^3$ may be formed by the process of the invention. The most advantageous products of the invention have bulk densities of from about 25 to about 40 lbs./ft.$^3$.

The following procedures typify preparation of some of the high color channel carbon blacks which are advantageously used as starting products for the process of the invention. These blacks are produced by reacting blacks having an average diameter, as determined by electron microscopy, of at least about 15 millicrons and a porosity below about 200 with molecular oxygen at elevated temperatures.

For the purposes of the present invention, the porosity of a black is the difference obtained by deducting from the nitrogen surface area of a black (determined by the method of Brunauer-Emmett-Teller) that surface area of the black obtained by calculating same from the observed average electron microscope particle diameter according to the following formula: Square meters per gram $=60,000/1.82$ (E.M. particle diameter in angstroms). The difference obtained is generally believed by those well skilled in the art to be primarily due to the presence of small openings or pores in the surface of the black. The resultant blacks are intermediate products having a porosity of between about 220 and 400. The intermediate products are then reacted with an oxidizing agent such as nitric and/or a nitric oxide to increase the volatile content by about 40%. The following examples illustrate the production of carbon blacks which may be used as starting materials in the process of the instant invention.

Example 1

600 grams of Monarch 74, a channel black produced by Cabot Corporation and having a nitrogen surface area of 230 square meters per gram, an average electron microscope particle diameter of 17 millimicrons and a porosity of about 130, were air aftertreated by passing 20 cubic feet of air per hour thereover while the black was slowly rotated in a 6 inch diameter by 12 inch long cylinder maintained at 1000° F. for 6 hours. The so air aftertreated black had the following properties:

| | |
|---|---|
| Scale | 74.5 |
| Apparent bulk density (lbs./ft.$^3$) | 10 |
| Volatile content (percent) | 10 |
| $N_2$ surface area ($M^2$/gm.) | 500 |
| Average electron microscope | 15 |
| Particle diameter (millimicrons) porosity | 284 |

Various concentrations of the above air aftertreated black were further treated by slurrying same with aqueous nitric acid solutions of various concentrations for various lengths of time and at various temperatures. The so treated blacks were subsequently heated until dry and the following data were obtained:

| No. | Black conc. in slurry (percent) | HNO$_3$ conc. in liquid phase (percent) | Reaction time (min.) | Temp. reaction (° F.) | Drying time (hours) | Drying temp. (° F.) | Scale | Percent vol. |
|---|---|---|---|---|---|---|---|---|
| 1 | 50 | 15 | 30 | 80 | 16 | 230 | 71.5 | 27.2 |
| 2 | 10 | 15 | 30 | 80 | 16 | 475 | 74.4 | 13.6 |
| 3 | 10 | 50 | 30 | 80 | 16 | 230 | 74.3 | 19.0 |
| 4 | 10 | 15 | 30 | 80 | 24 | 230 | 73.8 | 15.7 |
| 5 | 10 | 40 | 30 | 80 | 16 | 230 | 73.4 | 16.9 |
| 6 | 10 | 15 | 30 | 80 | 16 | 230 | 74.7 | 14.8 |
| 7 | 20 | 40 | 30 | 80 | 16 | 230 | 72.4 | 16.1 |

Example 2

500 lbs. of a carbon black having a nitrogen surface area of 380 square meters per gram and an average electron microscope particle diameter of 16 millimicrons and a porosity of about 178 were air aftertreated by continually passing air thereover while the black was slowly rotated in a cylinder maintained at a temperature of about 1000° F. for about 4 hours. The so air aftertreated black had the following properties:

| | |
|---|---|
| Scale | 70 |
| Apparent bulk density (lbs./ft.$^3$) | 20 |
| Volatile content (percent) | 10 |
| $N_2$ surface area ($M^2$/gm.) | 550 |
| Average electron microscope | 15 |
| Particle diameter (millimicrons) porosity | 334 |

A sample of a carbon black prepared in the above-described manner was slurried with nitric acid in a 25 r.p.m. pelletizer for 30 minutes at a temperature of 90° F. The concentration of the black in the slurry was 47.6% and the concentration of the HNO$_3$ in the liquid phase was 11.8%. Thereafter, the black was heated at a constant temperature of 275° F. for 9 hours in a drum dryer maintained at about 30 r.p.m. The pigment produced had a nigrometer scale of 70.0, a percent volatile of 17.1% and a density of 33.3 lbs./ft.$^3$.

Example 3

A carbon black having a nitrogen surface area of about 180 $M^2$/gm. and an average electron microscope diameter of about 20 millimicrons and a porosity of about 36 was air aftertreated by passing 25 cubic feet of air per hour thereover while the black was slowly rotated in a 6 inch diameter by 12 inch long cylinder maintained at 1200° F. for 8 hours. The so air aftertreated black had the following properties:

| | |
|---|---|
| Scale | 73.2 |
| Apparent bulk density (lbs./ft.$^3$) | 15 |
| Percent volatile | 9 |
| $N_2$ surface area ($M^2$/gm.) | 480 |
| Average electron microscope | 17 |
| Particle diameter (millimicrons) porosity | 299 |

Thereafter, a slurry was formed containing 25% by weight of the aftertreated black using 20% HNO$_3$ by weight in the aqueous liquid phase and agitated for 40 minutes at a temperature of 70° F. The mixture was then heated in a drum type dryer turning at 3.3 revolutions per hour for 8 hours at a constant temperature of 190° F. The final pigment had a nigrometer scale of 72.4%, a percent volatile of 15.7 and a density of 25 lbs./ft.$^3$.

The system in which these carbon blacks are slurried in the process of the present invention is conveniently an aqueous system although, where economical and convenient, other liquid dispersion media may be used.

Among dispersing agents which are advantageous for use in the process of the invention are anionic surfactants such as a partially desulfonated sodium lignosulfonate sold under the trade name Marasperse CB by Marathorn Corporation and polymerized potassium salts of alkylated naphthalene sulfonic acids sold under the trade name Daxad 11 by W. R. Grace and Co. In view of this disclosure, various other dispersing agents may be selected by those skilled in the art for use in the process of the invention. Conveniently 5 to 6%, based on the weight of carbon black, of the aforesaid dispersing agents may be used but, in general, the quantity may be decreased or increased depending on the particular circumstances of the slurring procedure utilized in any given case.

Since the next step following slurry of the carbon black is to be spray drying, it will be understood that sufficient liquid should be used as a dispersant to provide an adequate carrier for the carbon black and facilitate the passage of the slurry through the apertures of the spray drying apparatus. On the other hand, economics of a spray drying process dictate that as little liquid be used as is practical to achieve the desired results. This is of course, to conserve energy required to evaporate the aforementioned liquid carrier from the carbon black product.

In practice, it has been found that about 100 parts of carbon black can be advantageously slurried in about 400 parts of water to form a slurry of about 20% by weight carbon black with about 6 parts of a dispersing agent like the aforementioned sodium lignosulfonate sold under the trade name Marasperse CB. Where a higher carbon black-to-water ratio is used, somewhat more dispersing agent will usually be required; where a lower carbon black-to-water ratio is used, somewhat less dispersing agent will usually be required. Furthermore, the particle size may be varied somewhat by modifying the speed of the spray wheel and the dispersion concentration of the carbon black.

Spray drying is conveniently accomplished by feeding the carbon black slurry, conveniently at room temperature, into a spray drying apparatus as is known to the art. Conveniently, hot gases will be conducted into the chamber at temperatures about 550° F. and exhausted at about 230° F., although other temperatures may be used where economics or other conditions make them so desirable. Of course, in any event, the temperatures must be sufficiently high to evaporate sufficient of the liquid in which the carbon black has been slurried.

When the process is carried out using the carbon black of Example 3 above and the aforementioned process conditions, the product is a free-flowing black powder having a bulk density of from 30 to 35 lbs. per cubic foot. This high bulk density is typical of, and in most cases even greater than, bulk densities of pelletized carbon blacks. Yet the instant product is comprised of secondary agglomerates much smaller than those encountered in the pelletized blacks known to the art. Moreover, the size of these agglomerates contributes to the product's being easily dispersible on apparatus providing relatively mild dispersing action. For example, 3-roll mills, 2-roll mills, dough mixers and the like.

The following screen analysis (U.S. Series) is typical of the product of the invention:

| | Percent |
|---|---|
| Retained on 125 mesh | 7.4 |
| Passed 125 mesh; retained on 140 mesh | 1.3 |
| Passed 140 mesh; retained on 200 mesh | 16.9 |
| Passed 200 mesh; retained on 270 mesh | 68.0 |
| Passed 270 mesh; retained on 325 mesh | 3.8 |
| Passed 325 mesh | 1.8 |

As observed from the preceding table the size of the secondary agglomerates is predominantly finer than 140 mesh.

To illustrate the facility with which the product of the invention may be dispersed, the material was compounded with (1) relatively fast air-drying styrenated alkyd resin and (2) a relatively slow-drying styrenated alkyd resin on a 3-roll mill. The resultant products were compared with analogous products prepared with two other carbon blacks, A and B, described below.

The fast-air drying styrenated alkyd resin systems were prepared by dispersing 20 parts of carbon black in 200 parts of a styrenated alkyd resin, sold under the trade name Cycopol S101–1 by Koppers Company, on a 3-roll mill. Then 88 grams of the resulting mill paste were compounded with 160 grams of Cycopol S101–1 and 40 grams of xylol to form the fast-drying systems.

The slow-drying alkyd resin systems were prepared by dispersing 20 parts of carbon black in 200 parts of an alkyd resin sold under the trade name Aroplaze 1085M–50 by U.S. Industrial Chemicals Company on a 3-roll mill. Then 88 grams of the resulting mill paste were compounded with 200 grams of Aroplaze 1085M–50, 15 grams of mineral spirits, 0.6 gram of a 6% cobalt drier, 1.2 grams of a 24% lead drier, and 0.4 gram of an antiskinning agent sold under the trade name Eskin No. 2.

Black A was a fluffy high color channel (HCC) black having an average diameter of about 120 A., and Black B was a sample of the raw material, i.e. the same kind of HCC black which had been dispersed and spray dried to give the instant product and the preparation of which is described in Example 2. Black B however, was micronized in an attempt to obtain the smallest possible particle size before the tests were run.

Evaluations of Black A, Black B and the instant product were made in respect to color (darkness) and color quality (blueness). The color properties of each of the resulting lacquers were determined on glass panel drawdowns of the black lacquers using apparatus sold under the trade designation "Coloreye" produced by Instrument Development Laboratories, Inc. of Attleboro, Mass. and described in detail in their "Instruction Manual No. 1000G" for Model D Coloreye. The Coloreye measures light reflectance of a sample compared to a standard at three wave lengths, X, Y and Z, in the visible light spectrum. These wave lengths are red, green and blue wave lengths respectively. The lower reflectivity readings are considered the most desirable since lower reflectivity indicates greater absorption and darker color. The Blueness Factor is computed by the relationship $$\frac{X-Y}{Z} \times 100 = \text{Blueness Factor}$$

wherein X, Y and Z are the reflectivities at the aforesaid wave lengths. A lower Blueness Factor denotes a "bluer" and therefore a more desirable tone to the blacks' color characteristics.

| | Slow drying system | | | Blueness factor |
|---|---|---|---|---|
| | X | Y | Z | |
| Instant product | 125.5 | 123 | 120.5 | 4.1 |
| Black A | 100.0 | 100.0 | 100.0 | 1.0 |
| Black B | 146.0 | 139.0 | 131.0 | 10.8 |

| | Fast drying system | | | Blueness factor |
|---|---|---|---|---|
| | X | Y | Z | |
| Instant product | 81 | 80.5 | 89.5 | −10.6 |
| Black A | 100 | 100 | 100 | 1.0 |

Furthermore, in both systems use of the instant product contributed a considerable improvement in viscosity stability to the product:

| | Slow drying system | |
|---|---|---|
| | Initial viscosity | Viscosity after 16 hrs. at 140° F. |
| Instant product | 72 | 76 |
| Black A | 74 | 82 |
| Black B | 72 | 75 |

| | Fast drying system | |
|---|---|---|
| | Initial viscosity | Viscosity after 16 hrs. at 140° F. |
| Instant product | 63 | 63 |
| Black A | 70 | 84 |

The viscosity measurements are given in terms of Kreb units known to the art.

From the foregoing, it is clear that the product of the invention is a superior carbon black to Black B when dispersed on such equipment as 3-roll mills and that the product is clearly superior to HCC blacks in blueness and viscosity stability, and also superior in color to other HCC blacks in some circumstances. Moreover, the tests clearly demonstrate the surprising improvement in color properties imparted to carbon black by the method of the invention.

It is of course to be understood that numerous changes can be made in the ingredients, proportions and conditions set forth above without departing from the spirit of the invention as defined in the appended claims.

What is claimed is:

1. A process for producing a nonpelletized free flowing carbon black in the form of easily dispersible secondary agglomerates of high bulk density which process comprises forming in the presence of an anionic dispersing agent, an atomizable aqueous slurry containing at least about 20% by weight of a high color carbon black said carbon black having been prepared by (1) treating a carbon black having an average electron microscope particle diameter of at least about 15 millimicrons and a porosity below about 200 with molecular oxygen at elevated temperatures to produce an intermediate product having a porosity between about 220 and about 400 and (2) reacting said intermediate product in a slurry with an oxidizing agent chosen from the group consisting of nitric acids and nitric oxides to increase the volatile content by at least 40%, and spray drying said atomizable aqueous slurry under conditions which yield easily dispersible secondary agglomerates of carbon black which are predominantly below 140 mesh in U.S. series screen size and which have a bulk density of at least 25 lbs./cu. ft.

2. The process of claim 1 wherein the anionic dispersing agent is used in amounts of about 5 to 6% by weight based on the weight of carbon black.

References Cited

UNITED STATES PATENTS

| | | | |
|---|---|---|---|
| 2,046,758 | 7/1936 | Tucker | 106—307 |
| 2,690,398 | 9/1954 | Guertler et al. | 106—309 |
| 3,149,024 | 9/1964 | Behn et al. | 106—309 |
| 3,226,244 | 12/1965 | Jordan et al. | 106—307 |

OTHER REFERENCES

"Spray Drying Pigments," American Ink Maker, February 1959, pp. 30, 31, 57, 59.

TOBIAS E. LEVOW, *Primary Examiner.*

SAMUEL E. MOTT, *Assistant Examiner.*

U.S. Cl. X.R.

23—209.1, 314; 106—309